(12) United States Patent
Jung et al.

(10) Patent No.: US 12,512,514 B2
(45) Date of Patent: Dec. 30, 2025

(54) ELECTROLYTE SOLUTION FOR LITHIUM-SULFUR SECONDARY BATTERY AND LITHIUM-SULFUR SECONDARY BATTERY COMPRISING SAME

(71) Applicant: LG ENERGY SOLUTION, LTD., Seoul (KR)

(72) Inventors: Unho Jung, Daejeon (KR); Jaegil Lee, Daejeon (KR); Kihyun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 567 days.

(21) Appl. No.: 17/912,455

(22) PCT Filed: Jan. 6, 2022

(86) PCT No.: PCT/KR2022/000232
§ 371 (c)(1),
(2) Date: Sep. 16, 2022

(87) PCT Pub. No.: WO2022/149876
PCT Pub. Date: Jul. 14, 2022

(65) Prior Publication Data
US 2023/0130655 A1  Apr. 27, 2023

(30) Foreign Application Priority Data
Jan. 7, 2021  (KR) .................. 10-2021-0001815

(51) Int. Cl.
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/0037* (2013.01)

(58) Field of Classification Search
CPC .................. H01M 10/0567; H01M 10/0569
See application file for complete search history.

(56) References Cited

U.S. PATENT DOCUMENTS

| 1,506,316 A | 8/1924 | Markush |
| 2002/0025477 A1 | 2/2002 | Itagaki et al. |
| (Continued) | | |

FOREIGN PATENT DOCUMENTS

| CN | 107431247 A | 12/2017 |
| CN | 108292782 A | 7/2018 |
| (Continued) | | |

OTHER PUBLICATIONS

Xie, Z . (2020). "2-Fluoropyridine: A Novel Electrolyte Additive For Lithium Metal Batteries With High Areal Capacity As Well as High Cycling Stability", Chemical Engineering Journal, 393, Article No. 124789, pp. 1-10, See Abstract pp. 7 and 8, and Figure 5.

(Continued)

*Primary Examiner* — Sarah A. Slifka
(74) *Attorney, Agent, or Firm* — Bryan Cave Leighton Paisner LLP (57) ABSTRACT

The present disclosure relates to an electrolyte solution for a lithium-sulfur secondary battery and a lithium-sulfur secondary battery containing the same, and more particularly, to an electrolyte solution for a lithium-sulfur secondary battery comprising a lithium salt, a non-aqueous solvent and an additive, wherein the non-aqueous solvent comprises a linear ether and a cyclic ether, and the additive comprises a pyridine-based compound substituted with one or more fluorine.

9 Claims, 2 Drawing Sheets

(56) References Cited

U.S. PATENT DOCUMENTS

| | | |
|---|---|---|
| 2005/0175904 A1 | 8/2005 | Gorkovenko |
| 2014/0050991 A1 | 2/2014 | Kim |
| 2018/0006329 A1 | 1/2018 | Xiao et al. |
| 2018/0062207 A1 | 3/2018 | Matsuoka et al. |
| 2018/0248227 A1 | 8/2018 | Park et al. |
| 2018/0301739 A1 | 10/2018 | Park et al. |
| 2019/0088980 A1 | 3/2019 | Park et al. |
| 2019/0097270 A1 | 3/2019 | Park et al. |
| 2020/0211787 A1 | 7/2020 | Koda et al. |

FOREIGN PATENT DOCUMENTS

| | | |
|---|---|---|
| CN | 109075393 A | 12/2018 |
| CN | 111244543 A | 6/2020 |
| EP | 3 355 401 A1 | 8/2018 |
| EP | 3 657 521 A1 | 5/2020 |
| JP | 2002-093462 A | 3/2002 |
| JP | 2007-48545 A | 2/2007 |
| JP | 2018-530132 A | 10/2018 |
| JP | 2020-198276 A | 12/2020 |
| KR | 10-2007-0027512 A | 3/2007 |
| KR | 10-2014-0024079 A | 2/2014 |
| KR | 10-17358570000 B1 | 5/2017 |
| KR | 10-2017-0092455 A | 8/2017 |
| KR | 10-2017-0113601 A | 10/2017 |
| KR | 10-2017-0121047 A | 11/2017 |
| KR | 10-2018-0001997 A | 1/2018 |
| KR | 10-2018-0002000 A | 1/2018 |
| WO | 2019/017473 A1 | 1/2019 |

OTHER PUBLICATIONS

Gao, et al. (2011). Effects of Liquid Electrolytes on the Charge-Discharge Performance of Rechargeable Lithium/Sulfur Batteries: Electrochemical and in-Situ X-ray Absorption Spectroscopic Studies, J. Phys. Chem. C 2011, 115, 50, pp. 25132-25137.

ELECTROLYTE SOLUTION FOR LITHIUM-SULFUR SECONDARY BATTERY AND LITHIUM-SULFUR SECONDARY BATTERY COMPRISING SAME

CROSS CITATION WITH RELATED APPLICATIONS

This application is a National Phase entry pursuant to 35 U.S.C. § 371 of International Application No. PCT/KR2022/000232, filed on Jan. 6, 2022, and claims priority to and the benefit of Korean Patent Application No. 10-2021-0001815 filed on Jan. 7, 2021, all contents of which are incorporated herein by reference in their entirety.

TECHNICAL FIELD

The present disclosure relates to an electrolyte solution for a lithium-sulfur secondary battery and a lithium-sulfur secondary battery containing the same.

BACKGROUND

As the application area of a secondary battery expands to electric vehicles (EVs) and energy storage devices (ESSs), etc., a lithium-ion secondary battery having a relatively low weight-to-energy storage density (~250 Wh/kg) has limitations in application to these products. In contrast, a lithium-sulfur secondary battery is in the spotlight as a next-generation secondary battery technology because it can theoretically realize a high energy storage density (2,600 Wh/kg) compared to its weight.

The lithium-sulfur secondary battery refers to a battery system in which a sulfur-based material having a sulfur-sulfur bond (S—S bond) is used as a positive electrode active material and lithium metal is used as a negative electrode active material. Sulfur, which is the main material of the positive electrode active material has advantages that it is very rich in resources worldwide, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Sulfur, which is a positive electrode active material, is difficult to secure reactivity with electrons and lithium ions in a solid state due to its low electrical conductivity characteristics. In the existing lithium-sulfur secondary battery, in order to improve the reactivity of sulfur, an intermediate polysulfide in the form of $Li2Sx$ is generated to induce a liquid phase reaction and improve the reactivity. In this case, an ether-based solvent such as dioxolane and dimethoxy ethane, which are highly soluble for lithium polysulfide, is used as a solvent for the electrolyte solution.

However, when such an ether-based solvent is used, there is a problem that the lifetime characteristics of the lithium-sulfur battery are deteriorated due to various causes. For example, the lifetime characteristics of lithium-sulfur batteries may be deteriorated by the leaching of the lithium polysulfide from the positive electrode, the occurrence of a short due to the growth of dendrites on the lithium negative electrode and the deposition of by-products from the decomposition of the electrolyte solution, etc.

In particular, when such an ether-based solvent is used, it can dissolve a large amount of lithium polysulfide and thus has high reactivity. However, due to the nature of lithium polysulfide soluble in the electrolyte solution, the reactivity and lifetime characteristics of sulfur are affected depending on the content of the electrolyte solution.

One of the main factors affecting the lifetime in the lithium-sulfur secondary battery is the deterioration of the lithium negative electrode, which is due to the reaction with the positive electrode active material and the reaction with the electrolyte solution. As a result, the formation of the lithium dendrite and the degradation of the charging/discharging efficiency is occurred. In particular, when the lithium dendrite is formed in a one-dimensional shape, it passes through the separator with pores, thereby generating an internal short circuit of the battery and causing problems of stability and reduced lifetime. In order to reduce the problem of the lithium dendrite, studies are being conducted to uniformly stripping/plating the surface of the negative electrode, but in the prior art, the surface of the negative electrode cannot be sufficiently uniformly stripped/plating. Accordingly, there is a need for more studies on a method to solve the problem of the lithium dendrite by uniformly stripping/plating the surface of the negative electrode.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

PRIOR ART DOCUMENT

Patent Document (Patent Document 1) Korean Laid-open Patent Publication No. 10-2007-0027512 (Mar. 9, 2007), "ELECTROLYTES FOR LITHIUM-SULFUR ELECTROCHEMICAL CELLS"

DISCLOSURE

Technical Problem

Therefore, in the present disclosure, it was confirmed that by incorporating pyridine-based compounds substituted with one or more fluorine as an additive and thus solving the above problems, in order to inhibit the growth of the lithium dendrite of the lithium-sulfur secondary battery and to improve the lifetime characteristics of the battery, the performance of the lithium-sulfur secondary battery can be improved, thereby completing the present disclosure.

Accordingly, it is an object of the present disclosure to provide an electrolyte solution for a lithium-sulfur secondary battery that can solve the problem of the lithium dendrite and improve the lifetime characteristics of the battery. In addition, it is another object of the present disclosure to provide a lithium-sulfur secondary battery with improved battery performance by providing the electrolyte solution.

Technical Solution

In order to achieve the above objects, the present disclosure provides an electrolyte solution for a lithium-sulfur secondary battery comprising a lithium salt, a non-aqueous solvent and an additive, wherein the non-aqueous solvent contains a linear ether and a cyclic ether, and the additive contains a pyridine-based compound substituted with one or more fluorine.

The lithium salt can be at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, and lithium lower aliphatic carboxylate.

The lithium salt can be contained in a concentration of 0.1 M to 5.0 M.

The linear ether can be selected from the group consisting of dimethyl ether, diethyl ether, dipropyl ether, dibutyl ether, diisobutyl ether, ethyl methyl ether, ethyl propyl ether, ethyl tert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetra-ethylene glycol dimethyl ether, ethylene glycol divinyl ether, diethylene glycol divinyl ether, triethylene glycol divinyl ether, dipropylene glycol dimethyl ether, butylene glycol ether, diethylene glycol ethyl methyl ether, diethylene glycol isopropyl methyl ether, diethylene glycol butyl methyl ether, diethylene glycol tert-butyl ethyl ether, and ethylene glycol ethyl methyl ether.

The cyclic ether can be selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetra-hydropyran, furan and 2-methylfuran.

The volume ratio of the linear ether and the cyclic ether can be 9:1 to 1:9.

The additive can comprise a compound represented by the following Chemical formula 1:

[Chemical formula 1]

wherein X represents a fluorine atom, and n is an integer of 1 to 5.

The additive can comprise at least one selected from the group consisting of 2-fluoropyridine, 2,3-difluoropyridine, 2,4-difluoropyridine, 2,5-difluoropyridine, 3,4-difluoropyridine, 3,5-difluoropyridine, 2,6-difluoropyridine, 2,3,5,6-tetrafluoropyridine, and pentafluoropyridine.

The content of the additive can be 0.1 wt. % to 10 wt. %, relative to the total weight of the electrolyte solution.

The content of the pyridine-based compound can be 0.1 wt. % to 10 wt. %, relative to the total weight of the electrolyte solution.

The additive can further comprise at least one selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetra-methyl piperidinyloxyl.

In addition, the present disclosure provides a lithium-sulfur secondary battery comprising a positive electrode, a negative electrode, a separator between the positive electrode and the negative electrode, and the electrolyte solution described above.

Advantageous Effects

The electrolyte solution for the lithium-sulfur secondary battery according to the present disclosure comprises a lithium salt, a non-aqueous solvent, and an additive, and the additive includes a specific organic compound, and thus an effect of suppressing the growth of the lithium dendrite during the operation of the lithium-sulfur secondary battery and improving the lifetime characteristics of the battery is exhibited.

DETAILED DESCRIPTION

The embodiments provided according to the present disclosure can all be achieved by the following description. It is to be understood that the following description describes preferred embodiments of the present disclosure and it should be understood that the present disclosure is not necessarily limited thereto.

The present disclosure provides an electrolyte solution for a lithium-sulfur secondary battery comprising a lithium salt, a non-aqueous solvent and an additive, wherein the non-aqueous solvent contains a linear ether and a cyclic ether, and the additive contains a pyridine-based compound substituted with one or more fluorine.

The electrolyte solution for the lithium-sulfur secondary battery of the present disclosure may include a lithium salt and a non-aqueous solvent, and the lithium salt is a material, which is easily soluble in non-aqueous organic solvent, and may be selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSCN, LiC(CF$_3$SO$_2$)$_3$, LiN(CF$_3$SO$_2$)$_2$, LiN ($C_2F_5SO_2)_2$, $LiN(SO_2F)_2$ and lithium lower aliphatic carboxylate, and preferably $LiN(CF_3SO_2)_2$ may be used.

The concentration of the lithium salt may be 0.1 to 5.0 M, specifically 0.2 to 3.0 M, more specifically 0.5 to 2.0 M depending on various factors such as the exact composition of the electrolyte mixture, the solubility of the salt, the conductivity of the dissolved salt, the charging and discharging conditions of the battery, the operating temperature, and other factors known in the lithium battery field. If the concentration of the lithium salt is less than 0.1 M, the conductivity of the electrolyte may be lowered and thus the performance of the electrolyte may be deteriorated. If the concentration of the lithium salt is more than 5.0 M, the viscosity of the electrolyte may increase and thus the mobility of the lithium ion ($Li^+$) may be reduced.

The non-aqueous solvent may be an ether-based solvent, and the ether-based solvent may comprise a linear ether and a cyclic ether.

Meanwhile, the carbonate-based electrolyte solution commonly used in the lithium-ion battery can undergoes i) a nucleophilic reaction with lithium polysulfide leached from the positive electrode of the lithium-sulfur secondary battery, resulting in a reaction similar to the methylation of thiolate by dimethyl carbonate, and can forms ii) ethylene carbonate and thioether and so on, and thus can accelerate the degradation of the battery by causing consumption of the lithium polysulfide, which is an active material, and the carbonate-based electrolyte solution, which is a solvent. Therefore, it is preferable that the electrolyte solution for the lithium-sulfur secondary battery of the present disclosure does not contain a carbonate-based electrolyte solution The linear ether may be selected from the group consisting of dimethyl ether, diethyl ether, dipropyl ether, dibutyl ether, diisobutyl ether, ethylmethyl ether, ethylpropyl ether, ethyl tert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetra-ethylene glycol dimethyl ether, ethylene glycol divinylether, diethylene glycol divinylether, triethylene glycol divinylether, dipropylene glycol dimethyl ether, butylene glycol ether, diethylene glycol ethylmethyl ether, diethylene glycol isopropylmethyl ether, diethylene glycol butylmethyl ether, diethylene glycol tert-butylethyl ether, and ethylene glycol ethylmethyl ether, and preferably dimethoxyethane may be used.

The cyclic ether may be selected from the group consisting of dioxolane, methyldioxolane, dimethyldioxolane, vinyldioxolane, methoxydioxolane, ethylmethyldioxolane, oxane, dioxane, trioxane, tetrahydrofuran, methyl tetrahydrofuran, dimethyl tetrahydrofuran, dimethoxy tetrahydrofuran, ethoxy tetrahydrofuran, dihydropyran, tetra-hydropyran, furan, and 2-methylfuran, and preferably dioxolane may be used.

The volume ratio of the linear ether and the cyclic ether may be 9:1 to 1:9, preferably 8:2 to 2:8, and more preferably 7:3 to 3:7. If the volume ratio of the linear ether and the cyclic ether is out of the above range, the effect of improving the lifetime characteristics of the battery is insufficient and thus the desired effect cannot be obtained. Therefore, it is preferable that the volume ratio of the linear ether and the cyclic ether satisfies the above range.

The electrolyte solution for the lithium-sulfur secondary battery of the present disclosure may comprise a pyridine-based compound substituted with one or more fluorine as an additive, and preferably may comprise a pyridine-based compound substituted with one or more and five or less fluorenes.

The additive may comprise a compound represented by the following Chemical formula 1:

[Chemical formula 1]

wherein X represents a fluorine atom, and n is an integer of 1 to 5.

In addition, the additive may comprise at least one selected from the group consisting of 2-fluoropyridine, 2,3-difluoropyridine, 2,4-difluoropyridine, 2,5-difluoropyridine, 3,4-difluoropyridine, 3,5-difluoropyridine, 2,6-difluoropyridine, 2,3,5,6-tetrafluoropyridine and pentafluoropyridine, preferably 2-fluoropyridine, or pentafluoropyridine, more preferably pentafluoropyridine.

The content of the additive may be 0.1 wt. % to 10 wt. %, preferably 0.1 wt. % to 7 wt. %, more preferably 0.1 wt. % to 5 wt. %, relative to the total weight of the electrolyte solution. In addition, the content of the pyridine-based compound may be 0.1 wt. % to 10 wt. %, preferably 0.1 wt. % to 7 wt. %, more preferably 0.1 wt. % to 5 wt. %, relative to the total weight of the electrolyte solution. If the content of the additive and pyridine-based compound is less than 0.1 wt. %, the growth of lithium dendrite cannot be sufficiently inhibited. If the content of the additive and pyridine-based exceeds 10 wt. %, there is a risk that the resistance may increase due to the film of the lithium electrode. Therefore, it is preferable that the content of the additive and pyridine-based compound satisfies the above range.

The electrolyte solution for the lithium-sulfur secondary battery of the present disclosure may further comprise nitric acid or nitrous acid-based compounds as an additive. The nitric acid or nitrous acid-based compounds have an effect of forming a stable coating on the lithium electrode and improving the charging/discharging efficiency. The nitric acid or nitrous acid-based compounds may be, but are not limited to, at least one selected from the group consisting of inorganic nitric acid or nitrous acid-based compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), ammonium nitrite ($NH_4NO_2$); organic nitric acid or nitrous acid-based compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; organic nitro compounds such as nitromethane, nitropropane, nitrobutane, nitrobenzene, dinitrobenzene, nitropyridine, dinitropyridine, nitrotoluene, dinitrotoluene, and the combinations thereof. Preferably, lithium nitrate ($LiNO_3$) may be used.

In addition, the electrolyte solution may further comprise other additives for the purpose of improving charging/discharging characteristics, flame retardancy, and the like. Examples of the additives may comprise triethylphosphite, triethanolamine, cyclic ether, ethylene diamine, n-glyme, hexamethyl phosphoric triamide, nitrobenzene derivatives, sulfur, quinoneimine dyes, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propen sultone (PRS), vinylene carbonate (VC) and the like.

The method for preparing the electrolyte solution for the lithium-sulfur secondary battery of the present disclosure is not particularly limited in the present disclosure, and may be prepared by a conventional method known in the art.

The present disclosure provides a lithium-sulfur secondary battery comprising the above-described electrolyte solution for the lithium-sulfur secondary battery.

The lithium-sulfur secondary battery may comprise a positive electrode, a negative electrode, a separator and an electrolyte solution interposed between the positive electrode and the negative electrode, and may comprise the electrolyte solution for the lithium-sulfur secondary battery according to the present disclosure as an electrolyte solution.

The positive electrode may comprise a positive electrode current collector and a positive electrode active material layer applied to one or both surfaces of the positive electrode current collector.

The positive electrode current collector is for supporting the positive electrode active material layer, and is not particularly limited as long as it has electrical conductivity without causing chemical changes in the battery. For example, copper, stainless steel, aluminum, nickel, titanium, palladium, sintered carbon; copper or stainless-steel surface-treated with carbon, nickel, silver or the like; aluminum-cadmium alloy or the like may be used.

The positive electrode current collector can have minute irregularities formed on its surface to enhance the bonding force with the positive electrode active material, and may be formed in various forms such as film, sheet, foil, mesh, net, porous body, foam, nonwoven fabric or the like.

The positive electrode active material may comprise a positive electrode active material and optionally an electrically conductive material and a binder.

The positive electrode active material may be at least one selected from the group consisting of elemental sulfur ($S_8$); $Li_2S_n(n \geq 1)$, organic sulfur compound or carbon-sulfur polymer $((C_2S_x)_n: x=2.5 \sim 50, n \geq 2)$. Preferably, the inorganic sulfur ($S_8$) can be used.

The positive electrode may further comprise at least one additive selected from a transition metal element, a group IIIA element, a group IVA element, a sulfur compound of these elements, and an alloy of these elements and sulfur, in addition to the positive electrode active material.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

The electrically conductive material is intended to improve electrical conductivity and is not particularly limited as long as it is an electronically conductive material that does not cause chemical change in the lithium secondary battery. Generally, carbon black, graphite, carbon fiber, carbon nanotube, metal powder, electrically conductive metal oxide, organic electrically-conductive material and the like can be used. Products that are currently marketed as electrically conductive materials may comprise acetylene black series (products from Chevron Chemical Company or Gulf Oil Company), Ketjen Black EC series (products from Armak Company), Vulcan XC-72 (a product from Cabot Company) and Super P (a product from MMM). For example, acetylene black, carbon black, graphite, etc. may be used.

In addition, the positive electrode active material layer may further comprise a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC) and the like can be used.

As the positive electrode, a positive electrode having a high sulfur loading may be used. The loading amount of sulfur may be 3.0 mAh/cm$^2$ or more, preferably 4.0 mAh/cm$^2$ or more, and more preferably 5.0 mAh/cm$^2$ or more.

The negative electrode may comprise a negative electrode current collector and a negative electrode active material positioned on the negative electrode current collector. Also, the negative electrode may be a lithium metal plate.

The negative electrode current collector is for supporting the negative electrode active material and is not particularly limited as long as it is electrochemically stable in the voltage range of the lithium secondary battery while having excellent conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam, or nonwoven fabric.

The negative electrode active material may comprise a material capable of reversibly intercalating or de-intercalating lithium ($Li^+$), a material capable of reacting with lithium ion to reversibly form lithium containing compounds, or lithium metal or lithium alloy. The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicone. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically may be in the form of a lithium metal thin film or lithium metal powder.

The method of forming the negative electrode active material is not particularly limited, and a method of forming a layer or film commonly used in the art may be used. For example, a method such as compression, coating, or deposition may be used. In addition, a case, in which a thin film of metallic lithium is formed on a metal plate by initial charging after assembling a battery without a lithium thin film in the current collector, is also comprised in the negative electrode of the present disclosure.

The separator is a physical separator having a function of physically separating the positive electrode and the negative electrode in the lithium-sulfur secondary battery, and can be used without particular limitation as long as it is generally used as a separator in the lithium-sulfur secondary battery. In particular, the separator is preferable as long as it has a low resistance to ion migration in the electrolyte solution and an excellent impregnating ability for the electrolyte solution.

The separator may be consisted of a porous substrate. Any porous substrate can be used as long as it is a porous substrate commonly used in electrochemical devices, and for example, a polyolefin-based porous membrane or nonwoven fabric may be used, but it is not particularly limited thereto.

Examples of the polyolefin-based porous membrane may be membranes formed of any polymer alone selected from polyethylene such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof.

In addition to the above-mentioned polyolefin-based non-woven fabric, the nonwoven fabric may be a nonwoven fabric formed of, for example, any polymer alone selected from polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and the like, or formed of a polymer mixture thereof. The structure of the nonwoven fabric may be a spunbonded nonwoven fabric or a melt blown nonwoven fabric composed of long fibers.

The thickness of the porous substrate is not particularly limited, but may be 1 to 100 μm, preferably 5 to 50 μm. The size and porosity of the pores present in the porous substrate are also not particularly limited, but may be 0.001 to 50 μm and 10 to 95%, respectively.

The electrolyte comprises lithium ions, and is used for causing an electrochemical oxidation or reduction reaction between a positive electrode and a negative electrode through these, which is as described above.

The injection of the electrolyte solution can be performed at an appropriate stage of the manufacturing process of the electrochemical device depending on the manufacturing process and required properties of the final product. That is, it can be applied before assembling the electrochemical device or in the final stage of assembling the electrochemical device.

In the case of the lithium-sulfur secondary battery according to the present disclosure, it is possible to perform laminating or stacking and folding processes of the separator and the electrode, in addition to the winding process which is a general process.

The shape of the lithium-sulfur secondary battery is not particularly limited, and may be of various shapes such as a cylindrical shape, a laminate shape, or a coin shape.

Hereinafter, preferred examples are presented to help the understanding of the present disclosure, but the following examples are provided to make the present disclosure easier to understand, and the present disclosure is not limited thereto.

EXAMPLES

Preparation of Electrolyte Solution for Lithium-Sulfur Secondary Battery

Example 1

1.0 M of LiTFSI((CF$_3$SO$_2$)$_2$NLi), 1 wt. % of LiNO$_3$ and 0.1 wt. % of pentafluoropyridine were added to a solvent obtained by mixing 1,3-dioxolane (DOL) and 1,2-dimethoxyethane (DME) in a volume ratio (v/v) of 50:50 to prepare an electrolyte solution for a lithium-sulfur secondary battery.

Example 2

An electrolyte solution for a lithium-sulfur secondary battery was prepared in the same manner as in Example 1, except that 5 wt. % of the pentafluoropyridine was added.

Example 3

An electrolyte solution for a lithium-sulfur secondary battery was prepared in the same manner as in Example 1, except that 2-fluoropyridine was added instead of the pentafluoropyridine.

Example 4

An electrolyte solution for a lithium-sulfur secondary battery was prepared in the same manner as in Example 1, except that 2,6-difluoropyridine was added instead of the pentafluoropyridine.

Example 5

An electrolyte solution for a lithium-sulfur secondary battery was prepared in the same manner as in Example 1, except that 1.0 wt. % of 2,3,5,6-tetrafluoropyridine was added instead of 0.1 wt. % of pentafluoropyridine.

Comparative Example 1

An electrolyte solution for a lithium-sulfur secondary battery was prepared in the same manner as in Example 1, except that pentafluoropyridine was not added.

Comparative Example 2

An electrolyte solution for a lithium-sulfur secondary battery was prepared in the same manner as in Example 1, except that 20 wt. % of pentafluoropyridine was added.

Comparative Example 3

An electrolyte solution for a lithium-sulfur secondary battery was prepared in the same manner as in Example 1, except that 2,6-tert-butyl-4-methylpyridine was added instead of pentafluoropyridine.

Comparative Example 4

An electrolyte solution for a lithium-sulfur secondary battery was prepared in the same manner as in Example 1, except that 2-tert-butylpyridine was added instead of pentafluoropyridine.

Comparative Example 5

An electrolyte solution for a lithium-sulfur secondary battery was prepared in the same manner as in Example 1, except that 2-propylpyridine was added instead of pentafluoropyridine.

The components and contents of the additive in the electrolyte solutions for the lithium-sulfur secondary batteries of Examples 1 to 5 and Comparative Examples 1 to 5 are as shown in Table 1 below.

TABLE 1

| | Component | Content |
|---|---|---|
| Example 1 | pentafluoropyridine | 0.1 wt. % |
| Example 2 | pentafluoropyridine | 5.0 wt. % |
| Example 3 | 2-fluoropyridine | 0.1 wt. % |
| Example 4 | 2,6-difluoropyridine | 0.1 wt. % |
| Example 5 | 2,3,5,6-tetrafluoropyridine | 1.0 wt. % |
| Comparative Example 1 | — | — |
| Comparative Example 2 | pentafluoropyridine | 20 wt. % |
| Comparative Example 3 | 2,6-di-tert-butyl-4-methylpyridine | 0.1 wt. % |
| Comparative Example 4 | 2-tert-butylpyridine | 0.1 wt. % |
| Comparative Example 5 | 2-propylpyridine | 0.1 wt. % |

Experimental Example

Evaluation of Lifetime Characteristics of Lithium-Sulfur Secondary Battery

Sulfur was mixed with an electrically conductive material and a binder in acetonitrile using a ball mill to prepare a slurry for the positive electrode active material layer. At this time, the carbon black was used as an electrically conductive material, and the binder of the mixed form of SBR and CMC was used as a binder, the mixing ratio was allowed to be a weight ratio 72:24:4 of sulfur:electrically conductive material:binder. The slurry for the positive electrode active material was applied to the aluminum current collector at a loading amount of 5.4 mAh/cm², followed by drying to prepare a positive electrode having a porosity of 70%. Also, the lithium metal having a thickness of 35 μm was used as a negative electrode.

After positioning the positive electrode and the negative electrode prepared by the above-described method to face each other, a polyethylene separator having a thickness of 16 μm and a porosity of 45% was interposed between the positive electrode and the negative electrode.

Thereafter, the electrolyte solution according to Examples 1 to 5 and Comparative Examples 1 to 5 was injected into the case to prepare lithium-sulfur batteries.

Figure 1:
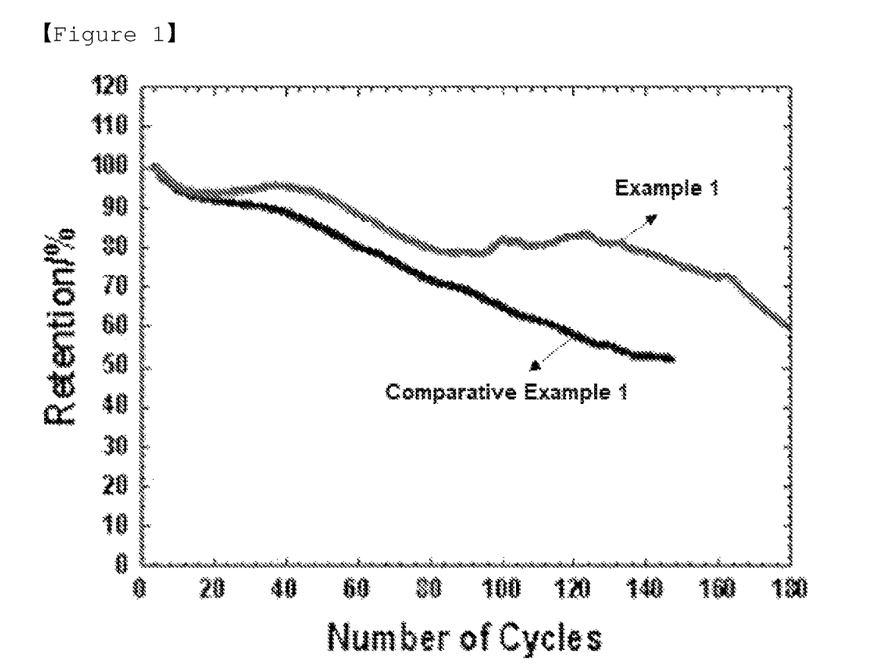
FIG. 1 is a graph showing the lifetime characteristics of the lithium-sulfur secondary batteries using the electrolyte solutions of Example 1 and Comparative Example 1.
Figure 2:
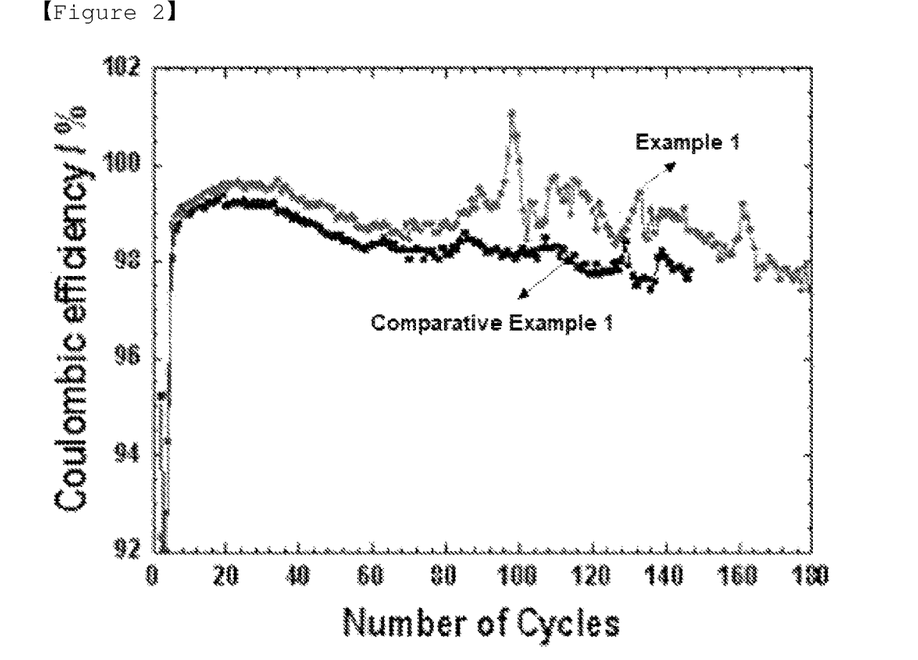
FIG. 2 is a graph showing the charging/discharging efficiency of the lithium-sulfur secondary batteries using the electrolyte solutions of Example 1 and Comparative Example 1.
Figure 3:
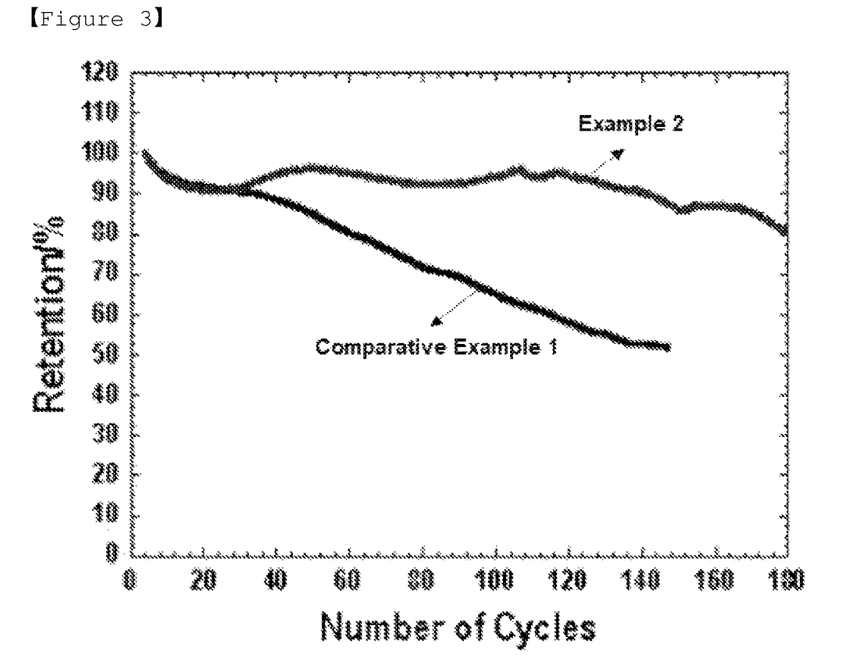
FIG. 3 is a graph showing the lifetime characteristics of the lithium-sulfur secondary batteries using the electrolyte solutions of Example 2 and Comparative Example 1.
Figure 4:
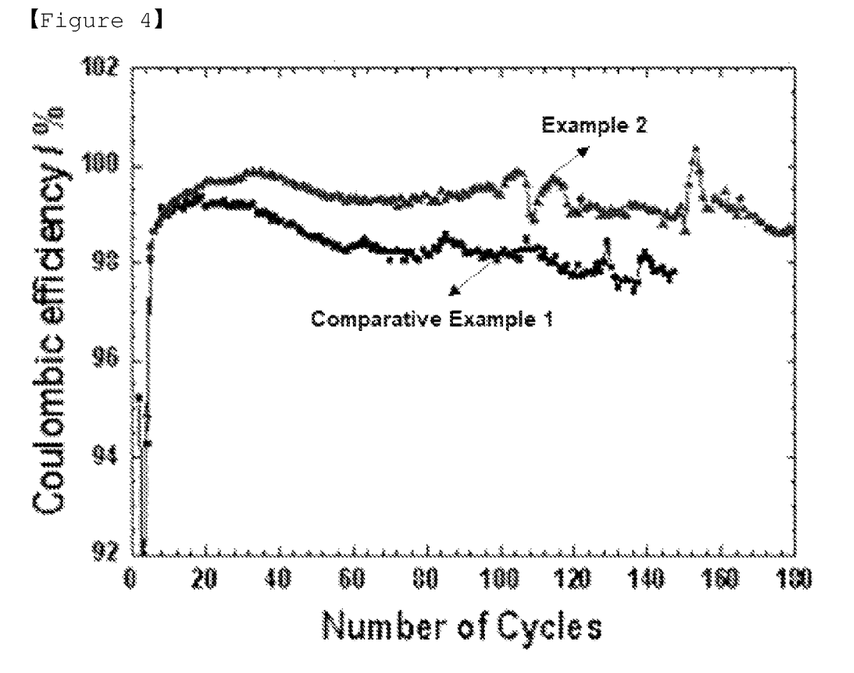
FIG. 4 is a graph showing the charging/discharging efficiency of the lithium-sulfur secondary batteries using the electrolyte solutions of Example 2 and Comparative Example 1.

The process of discharging lithium-sulfur secondary batteries prepared by the above method until reaching 1.8 V at a current density of 0.1 C and then charging it until reaching 2.5 V at a current density of 0.1 C was performed twice, and then after repeating the charging/discharging process once at a current density of 0.2 C, the process of charging at a current density of 0.3 C and discharging at a current density of 0.5 C was repeated 200 times to evaluate lifetime characteristics and charging/discharging efficiency of the batteries. At this time, the results to be obtained are shown in Table 2 and FIGS. 1 to 4.

TABLE 2

| | Lifetime cycle (80% capacity retention) | Charging/discharging efficiency (%) (Coulombic efficiency at 57th cycle) |
|---|---|---|
| Example 1 | 129 | 98.6647 |
| Example 2 | 180 | 99.3544 |
| Example 3 | 146 | 99.3099 |
| Example 4 | 78 | 98.8729 |
| Example 5 | 72 | 98.8453 |
| Comparative Example 1 | 57 | 98.2902 |
| Comparative Example 2 | 40 | 98.2105 |
| Comparative Example 3 | 52 | 97.2751 |
| Comparative Example 4 | 43 | 88.2575 |
| Comparative Example 5 | 45 | 87.2167 |

As shown in Table 2 above, it was confirmed that in the case of using the electrolyte solutions of Example 1 and Example 2 with pentafluoropyridine added, the initial discharge capacity or nominal voltage showed a tendency to increase, and lifetime was increased by more than double, as compared to the case of using the electrolyte solution of Comparative Example 1 in which pentafluoropyridine was not added. In addition, it was confirmed that when the efficiencies at the time of battery degradation (after 57 cycles) were compared, the electrolyte solutions of Examples 1 and 2 showed higher efficiency than the case of using the electrolyte solution of Comparative Example 1. In addition, it was confirmed that even when the electrolyte solutions of Examples 3 to 5 were used, the same tendency was exhibited as when the electrolyte solutions of Examples 1 and 2 were used.

Meanwhile, it could be confirmed that when the electrolyte solutions of Examples 1 to 5 according to the present disclosure were used, the lifetime and charging/discharging efficiency of the battery were improved, as compared to the electrolyte solutions of Comparative Examples 3 to 5 in which a pyridine-based compound not substituted with fluorine was added.

All simple modifications and variations of the present disclosure fall within the scope of the present disclosure, and the specific scope of protection of the present disclosure will become apparent from the appended claims.

The invention claimed is:

1. A lithium-sulfur secondary battery comprising:
   a positive electrode;
   a negative electrode;
   a separator between the positive electrode and the negative electrode; and
   an electrolyte solution,
   wherein the electrolyte solution comprises:
      a lithium salt;
      a non-aqueous solvent; and
      an additive,
   wherein the non-aqueous solvent comprises a linear ether and a cyclic ether, and the additive comprises a pyridine-based compound represented by the following Chemical formula 1:

[Chemical formula 1]

wherein X represents a fluorine atom, and n is an integer of 2 to 5, and
   wherein the pyridine-based compound substituted is included in an amount of 0.1 wt. % to 10 wt. % relative to the total weight of the electrolyte solution.

2. The lithium-sulfur secondary battery according to claim 1, wherein the lithium salt is at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, and lithium lower aliphatic carboxylate.

3. The lithium-sulfur secondary battery according to claim 1, wherein the lithium salt is contained in a concentration of 0.1 M to 5.0 M.

4. The lithium-sulfur secondary battery according to claim 1, wherein the linear ether is selected from the group consisting of dimethyl ether, diethyl ether, dipropyl ether, dibutyl ether, diisobutyl ether, ethylmethyl ether, ethylpropyl ether, ethyltert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetra-ethylene glycol dimethyl ether, ethylene glycol divinylether, diethylene glycol divinylether, triethylene glycol divinylether, dipropylene glycol dimethyl ether, butylene glycol ether, diethylene glycol ethylmethyl ether, diethylene glycol isopropylmethyl ether, diethylene glycol butylmethyl ether, diethylene glycol tert-butylethyl ether, and ethylene glycol ethylmethyl ether.

5. The lithium-sulfur secondary battery according to claim 1, wherein the cyclic ether is selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetra-hydropyran, furan and 2-methylfuran.

6. The lithium-sulfur secondary battery according to claim 1, wherein the volume ratio of the linear ether and the cyclic ether is 9:1 to 1:9.

7. The lithium-sulfur secondary battery according to claim 1, wherein the additive comprises at least one selected from the group consisting of 2,3-difluoropyridine, 2,4-difluoropyridine, 2,5-difluoropyridine, 3,4-difluoropyridine, 3,5-difluoropyridine, 2,6-difluoropyridine, 2,3,5,6-tetrafluoropyridine and pentafluoropyridine.

8. The lithium-sulfur secondary battery according to claim 1, wherein the content of the additive is 0.1 wt. % to 10 wt. % relative to the total weight of the electrolyte solution.

9. The lithium-sulfur secondary battery according to claim 1, wherein the additive further comprises at least one selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetra-methyl piperidinyloxyl.

* * * * *